(12) United States Patent
Kaczmar et al.

(10) Patent No.: US 10,295,066 B2
(45) Date of Patent: May 21, 2019

(54) BALL VALVE GEOMETRY AND DYNAMIC SEAL ASSEMBLY

(71) Applicant: GM Global Technology Operations LLC, Detroit, MI (US)

(72) Inventors: Michael Phylyp Kaczmar, Farmington Hills, MI (US); Kevin W. Herrala, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/724,999

(22) Filed: Oct. 4, 2017

(65) Prior Publication Data

US 2019/0101218 A1    Apr. 4, 2019

(51) Int. Cl.
*F16K 31/04* (2006.01)
*F16K 5/06* (2006.01)
*F01P 7/14* (2006.01)

(52) U.S. Cl.
CPC .............. *F16K 5/0626* (2013.01); *F01P 7/14* (2013.01); *F16K 5/0678* (2013.01); *F16K 31/041* (2013.01); *F01P 2007/146* (2013.01)

(58) Field of Classification Search
CPC .......... F16K 5/06; F16K 5/0626; F16K 5/201; F16K 31/041
See application file for complete search history.

(56) References Cited

U.S. PATENT DOCUMENTS

| | | | | |
|---|---|---|---|---|
| 4,593,918 A | * | 6/1986 | Geissler | F01L 7/10 123/188.6 |
| 5,611,516 A | * | 3/1997 | Reinicke | F16K 5/201 251/129.12 |
| 5,735,047 A | * | 4/1998 | Evans | B23P 15/001 29/890.13 |
| 7,712,724 B2 | * | 5/2010 | Thomas | F16K 5/201 137/602 |
| 2003/0193036 A1 | * | 10/2003 | Mike | F16K 5/0636 251/315.01 |
| 2006/0175571 A1 | * | 8/2006 | Held | B01F 13/1058 251/315.03 |
| 2017/0009894 A1 | * | 1/2017 | Seko | F16K 5/0663 |

* cited by examiner

Primary Examiner — Matthew W Jellett
(74) Attorney, Agent, or Firm — Harness, Dickey & Pierce, P.L.C.

(57) ABSTRACT

A ball valve assembly includes a housing having a valve chamber with an inlet opening and an outlet opening. A dynamic seal assembly including a spring member and a seal member are disposed in a seal chamber in one of the inlet opening and the outlet opening, wherein the spring member biases an end portion of the seal member into the valve chamber. A valve member includes a partially spherical outer surface with a recessed cam feature extending from the outer surface and a valve opening disposed in the outer surface, wherein during assembly of the valve member in the valve chamber the recessed cam feature is aligned with the end portion of the seal member and the valve member is rotated to engage the outer surface of the valve member with the end portion of the seal member.

12 Claims, 4 Drawing Sheets

BALL VALVE GEOMETRY AND DYNAMIC SEAL ASSEMBLY

FIELD

The present disclosure relates to a ball valve geometry and dynamic seal assembly.

BACKGROUND

This section provides background information related to the present disclosure which is not necessarily prior art.

Implementation of thermal control devices in vehicle propulsion systems is trending toward increased integration of control devices into base engine components, instead of adding thermal controls as a commodity component. This presents installation challenges with regard to installation of control devices that utilize dynamic seals.

SUMMARY

This section provides a general summary of the disclosure, and is not a comprehensive disclosure of its full scope or all of its features.

The present disclosure provides a ball valve assembly that has a novel shape and arrangement in order to install the ball valve past a dynamic seal. Once the ball valve is in position, it can be turned to apply a load on a spring loaded seal. The ball valve assembly removes the need for an external housing for the ball valve and seal assembly and allows the ball valve and seal to be integrated into the cylinder block or other engine structure.

The ball valve assembly includes a housing having a valve chamber with an inlet opening and an outlet opening. A dynamic seal assembly includes a spring member and a seal member disposed in a seal chamber in one of the inlet opening and the outlet opening, wherein the spring member biases an end portion of the seal member into the valve chamber. A valve member includes a partially spherical outer surface with a recessed cam feature extending from the outer surface and a valve opening disposed in the outer surface, wherein during insertion of the valve member in the valve chamber the recessed cam feature is aligned with the end portion of the seal member and the valve member is rotated to engage the outer surface with the end portion of the seal member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
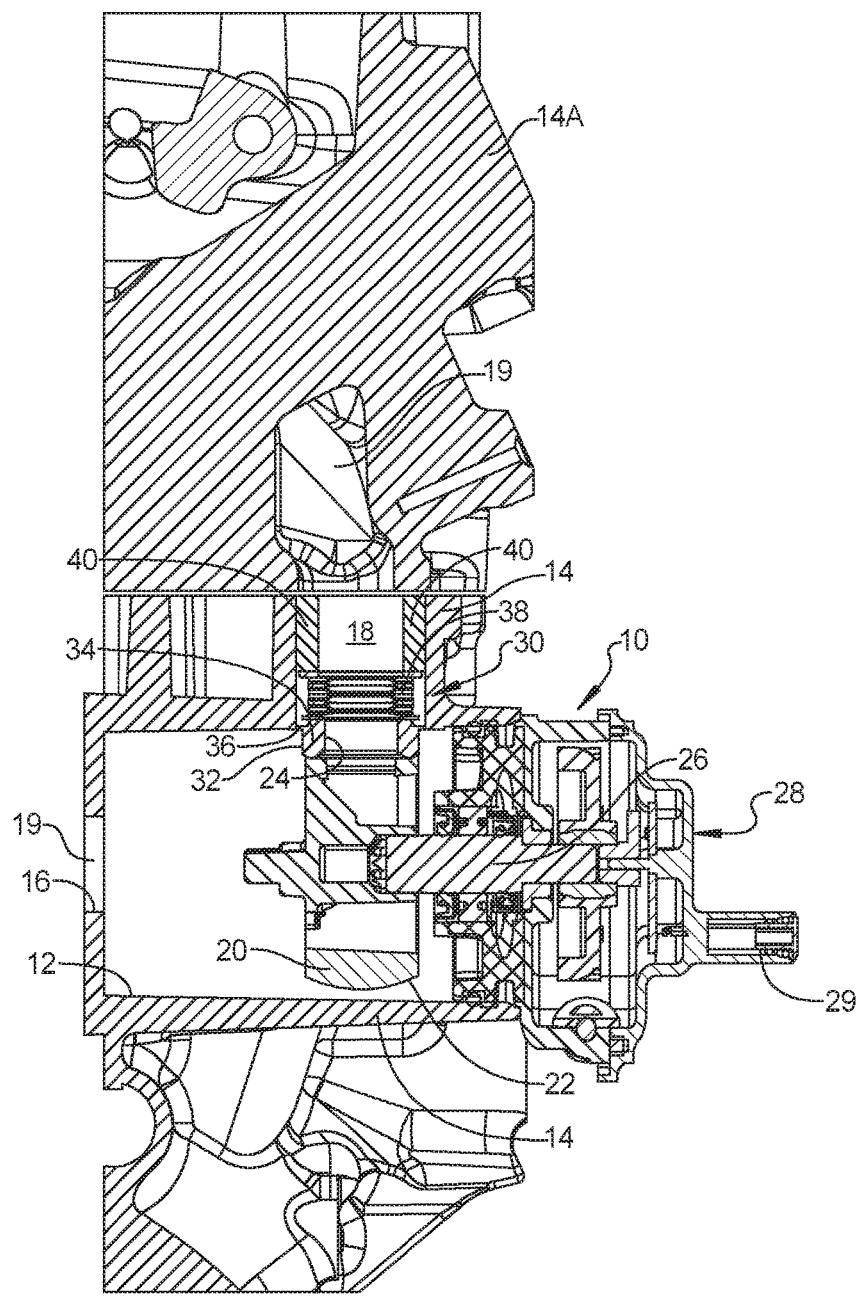
FIG. 1 is a cross-sectional view of the ball valve shown in an open position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a ball valve assembly 10 according to the principles of the present disclosure will now be described. The ball valve assembly 10 is shown installed in a valve chamber 12 disposed in a housing 14. The housing 14 can include an engine component such as a cylinder block, cylinder head or other component. While the present disclosure is being described with reference to insertion of the ball valve assembly 10 in an engine component, it should be understood that the principles of present invention can be applied to other devices such as a transmission housing or other housing of an industrial machine. The valve chamber 12 includes an inlet opening 16 and an outlet opening 18 which can be in communication with coolant passages 19 or for example passages for lubricating oil or hydraulic fluid. The coolant passages can be connected with coolant passages 19 in both the cylinder block 14 and the cylinder head 14A.

Figure 3:
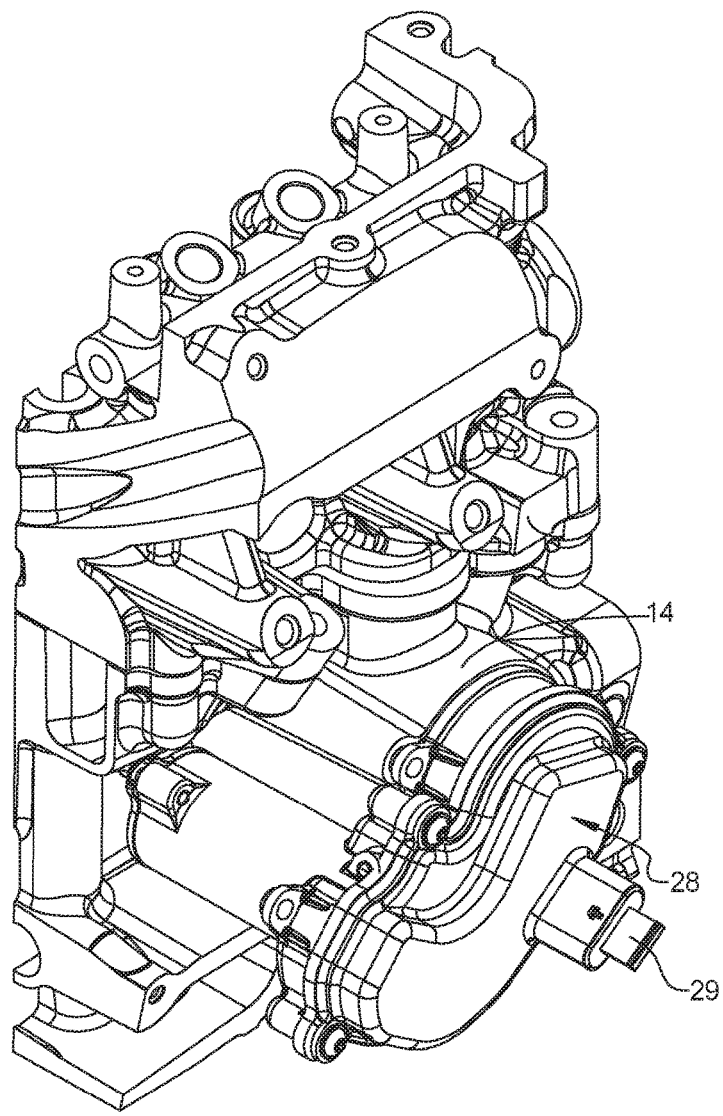
FIG. 3 is a perspective view of the ball valve assembly assembled to a cylinder block of an engine.

The ball valve assembly 10 includes a valve member 20 that includes a partially spherical outer surface 22. The partially spherical outer surface 22 includes a valve opening 24 disposed therein. The valve member 20 is connected to a rotatable drive shaft 26 that can be connected to an electric drive unit 28 or other drive mechanism. As shown in FIG. 3, the electric drive unit 28 can be mounted to the housing 14 and can include an electrical connector 29 for connecting to a wire harness.

The partially spherical outer surface 22 of the valve member 20 is contacted by a seal assembly 30 that is disposed in the outlet opening 18. The seal assembly 30 includes a seal member 32 in the form of an annular ring that is supported within the outlet opening 18 by a radially inwardly extending shoulder 34 of the outlet opening 18 that engages a radially outwardly extending shoulder 36 extending from the annular seal member 32. A spring member 38 is disposed within the outlet opening 18 and biases the seal member 32 so that an end portion 32A extends into the valve chamber 12. A spacer ring 40 can be provided within the outlet opening 18 to provide a seat surface against which the spring member 38 is seated. The seal assembly 30 can be trapped between the cylinder head 14A and a cylinder block 14 to provide for simple installation.

Figure 2:
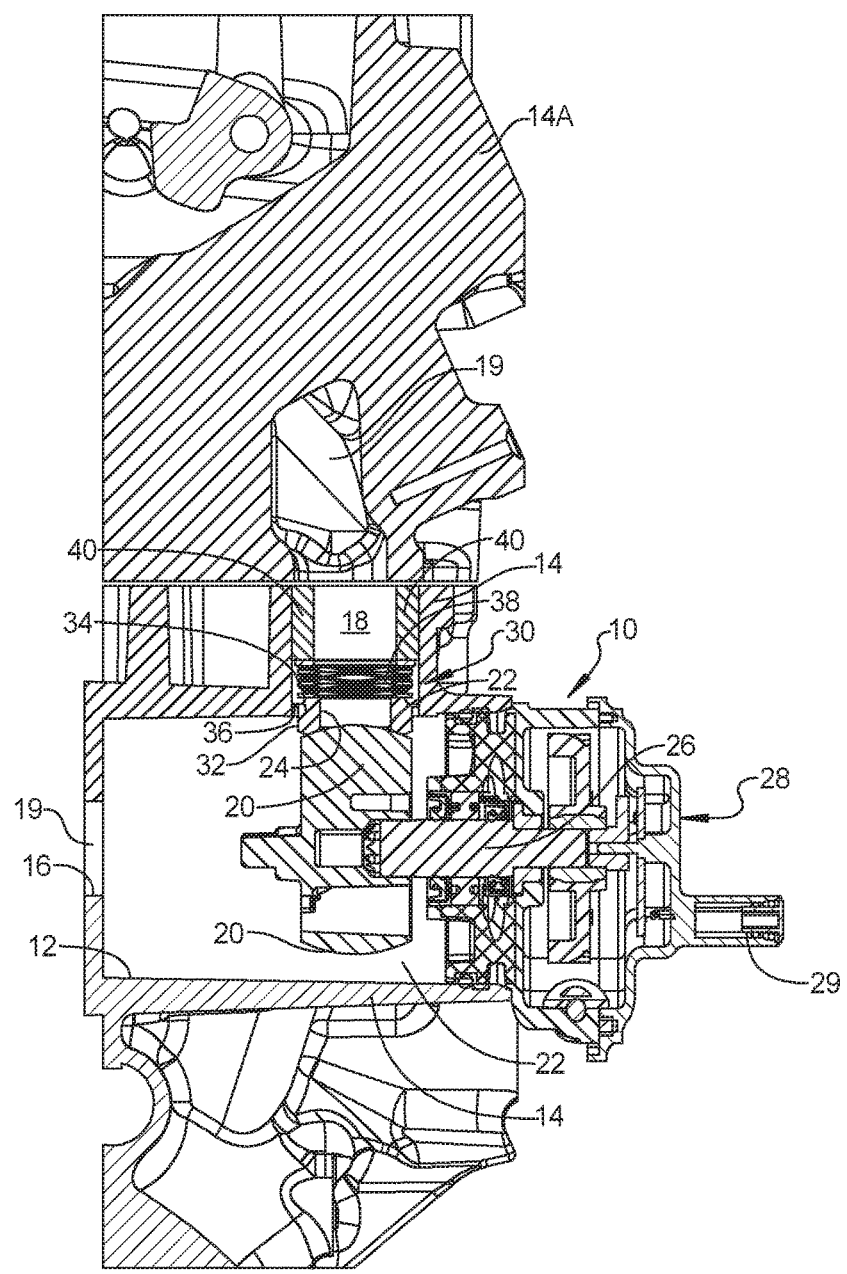
FIG. 2 is a cross-sectional view of the ball valve shown in a closed position.

In the open position, as illustrated in FIG. 1, the valve opening 24 is aligned with the seal member 32 so that there is open communication between the inlet opening 16 and outlet opening 18 of the valve chamber 12. As illustrated in FIG. 2, the valve member 20 is rotated by the electric drive unit 28 to a closed position where the valve member closes the opening to the seal member 32 so that there is no communication between the inlet opening 16 and outlet opening 18 of the valve chamber 12.

Figure 4:
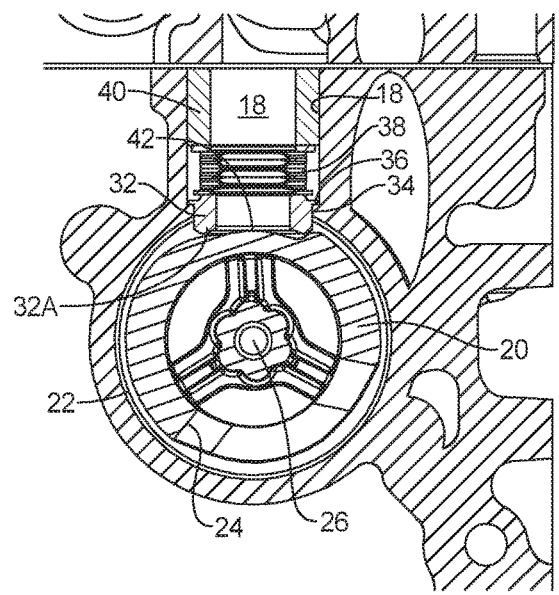
FIG. 4 is a cross-sectional view of the ball valve being inserted in the valve chamber according to the principles of the present disclosure.
Figure 5:
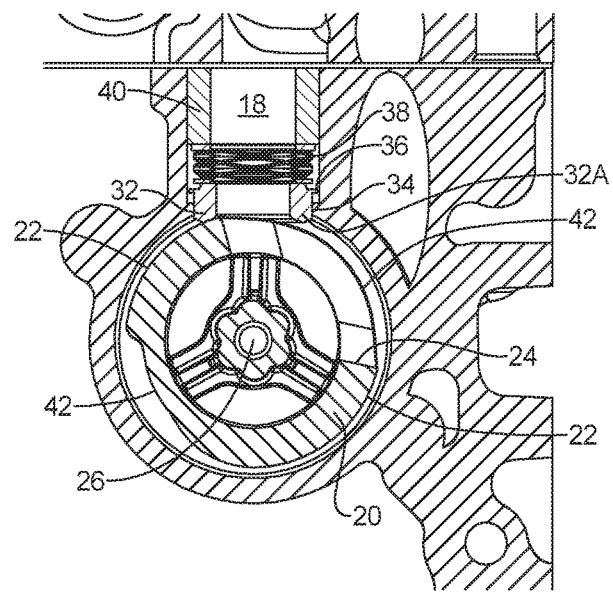
FIG. 5 is a cross-sectional view of the ball valve being installed in the valve chamber according to the principles of the present disclosure.

With reference to the cross-sectional view of FIG. 4, the valve member 20 is shown inserted into the valve chamber 12 with the end portion 32A of the seal member 32 fully extending into the valve chamber 12. The valve member 20 is provided with a recessed cam surface portion 42 that extends from the partially spherical outer surface 22. The recessed cam surface portion 42 provides clearance for the end portion 32A of the seal member 32 during insertion of the valve member 20 into the valve chamber 12. After the valve member 20 is inserted into the valve chamber 12 it can be turned to cause the seal member 32 to ride up the cam surface portion 42 and into engagement with the partially spherical outer surface 22 of the valve member 20, as illustrated in FIG. 5. As the seal member 32 rides up the cam surface portion 42, the spring member 38 becomes dynamically loaded so that the seal member 32 is biased against the outer surface 22 of the valve member 20.

It should be understood that the valve assembly 10 as described can be disposed to close either an inlet or an outlet opening. In other words, the direction of flow through the valve chamber 12 can be reversed so that the outlet opening 18 becomes the inlet opening.

The ball valve assembly 10 and method of installation solves the installation and service issue with integration of a ball valve into a main component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A ball valve assembly, comprising:
  a housing having a valve chamber with an inlet opening disposed along a first axis and an outlet opening disposed along a second axis generally perpendicular to the first axis;
  a dynamic seal assembly including a spring member and a seal member disposed in a seal chamber in one of the inlet opening and the outlet opening, wherein the spring member biases an end portion of the seal member into the valve chamber; and
  a valve member having an outer surface with one of a partially cylindrical or a partially spherical portion and the outer surface having a recessed cam feature extending from the partially cylindrical or the partially spherical portion and a valve opening disposed in the outer surface, wherein during assembly of the valve member, the valve member is inserted in the valve chamber along one of the first axis or the second axis with the recessed cam feature aligned with the end portion of the seal member and the valve member is rotated about the one of the first axis or the second axis to engage the partially cylindrical or the partially spherical portion of the outer surface with the end portion of the seal member, wherein the valve member is connected to a rotatable drive shaft that is connected to an electric drive unit, the rotatable drive shaft being rotatable about the one of the first or the second axis.

2. The ball valve assembly according to claim 1, wherein the electric drive unit is fastened to the housing.

3. The ball valve assembly according to claim 1, wherein the seal chamber includes a radially inwardly extending shoulder portion and the seal member includes a radially outwardly extending shoulder portion that are engageable with one another when the seal member is inserted in the seal chamber.

4. The ball valve assembly according to claim 1, further comprising a spacer ring disposed in the seal chamber and against an end of the spring member.

5. The ball valve assembly according to claim 1, wherein the housing includes an engine component.

6. The ball valve assembly according to claim 5, wherein the engine component is a cylinder block.

7. A method of installing a ball valve assembly, comprising:
providing a housing having a valve chamber with an inlet opening disposed along a first axis and an outlet opening disposed along a second axis generally perpendicular to the first axis;
inserting a dynamic seal assembly including a spring member and a seal member into a seal chamber in one of the inlet opening and the outlet opening, wherein the spring member biases an end portion of the seal member into the valve chamber; and
inserting a valve member having an outer surface with one of a partially cylindrical or a partially spherical portion and the outer surface having a recessed cam feature extending inward from the partially cylindrical or the partially spherical portion and the outer surface having a valve opening disposed in the outer surface, wherein during insertion of the valve member in the valve chamber along one of the first axis and the second axis the recessed cam feature is aligned with the end portion of the seal member; and
rotating the valve member about the one of the first axis and the second axis to engage the partially cylindrical or the partially spherical portion of the outer surface of the valve member with the end portion of the seal member, wherein the valve member is connected to a rotatable drive shaft that is connected to an electric drive unit, the rotatable drive shaft being rotatable about the one of the first or the second axis.

8. The method of installing a ball valve assembly according to claim 7, wherein the electric drive unit is fastened to the housing.

9. The method of installing a ball valve assembly according to claim 7, wherein the seal chamber includes a radially inwardly extending shoulder portion and the seal member includes a radially outwardly extending shoulder portion that are engageable with one another when the seal member is inserted in the seal chamber.

10. The method of installing a ball valve assembly according to claim 7, further comprising a spacer ring disposed in the seal chamber and against an end of the spring member.

11. The method of installing a ball valve assembly according to claim 7, wherein the housing includes an engine component.

12. The method of installing a ball valve assembly according to claim 11, wherein the engine component is a cylinder block.

* * * * *